US007167382B2

(12) United States Patent
Hachiya

(10) Patent No.: US 7,167,382 B2
(45) Date of Patent: Jan. 23, 2007

(54) SEMICONDUCTOR DEVICE

(75) Inventor: Yoshiaki Hachiya, Ootsu (JP)

(73) Assignee: Matsushita Electric Industrial Co., Ltd. (JP)

( * ) Notice: Subject to any disclaimer, the term of this patent is extended or adjusted under 35 U.S.C. 154(b) by 183 days.

(21) Appl. No.: 10/895,083

(22) Filed: Jul. 21, 2004

(65) Prior Publication Data

US 2005/0024900 A1 Feb. 3, 2005

(30) Foreign Application Priority Data

Jul. 28, 2003 (JP) ............................. 2003-280727

(51) Int. Cl.
*H02M 3/335* (2006.01)
(52) U.S. Cl. ....................................................... 363/24
(58) Field of Classification Search ................. 363/24, 363/34; 323/291, 292
See application file for complete search history.

(56) References Cited

U.S. PATENT DOCUMENTS 5,481,178 A * 1/1996 Wilcox et al. .............. 323/287
6,297,623 B1 * 10/2001 Balakrishnan et al. ...... 323/283

* cited by examiner

*Primary Examiner*—Burton S. Mullins
*Assistant Examiner*—Lucy Thomas
(74) *Attorney, Agent, or Firm*—Steptoe & Johnson LLP

(57) ABSTRACT

The present invention relates to a semiconductor device that is employed in a switching power supply for which a higher output is required, prevents noise from the coil, transformer, and so forth and implements a high efficiency power supply. By connecting a current mirror circuit including a p-type MOSFET, an overcurrent detection level tuning circuit, an overcurrent detection circuit, and an intermittent oscillation control circuit to an FB terminal peripheral circuit that is a feedback signal input terminal, PWM control capable of varying the IDRAIN peak value is implemented for the transition from a heavy load state to a light load state and intermittent oscillation control is implemented for the transition between a light load state to a loadless state, such that noise from the coil, transformer, and the like is suppressed and higher efficiency is realized.

4 Claims, 6 Drawing Sheets

SEMICONDUCTOR DEVICE

BACKGROUND OF THE INVENTION

1. Field of the Invention

The present invention relates to a semiconductor device employed in a power supply device such as a switching power supply, and relates more particularly to a power-saving technology for a power supply device.

2. Description of the Related Art

FIG. 5 shows a conventional semiconductor device (See U.S. Pat. No. 6,297,623, for example). The conventional semiconductor device is, in a broad classification, constituted by a switching element 1 and a control circuit 2 for controlling the switching element 1.

The switching element 1 is a high withstand voltage power element such as a power MOSFET.

The control circuit 2 comprises a total of five terminals, which are terminals connected to the DRAIN, GATE, and SOURCE terminals of the switching element 1 respectively, a BP terminal, which is a reference voltage terminal of the control circuit 2, and an FB terminal, which is a feedback signal input terminal. A regulator 3 is connected between the DRAIN terminal and BP terminal of the switching element 1, and a startup/stoppage circuit 4 and a fixed current supply 5 are connected to the BP terminal. The fixed current supply 5 and an N-type MOSFET 6 are connected between the BP terminal and FB terminal. A MAX DUTY signal 15 and CLOCK signal 16 are outputted by an oscillator 14, the MAX DUTY signal 15 being inputted to an AND circuit 17, whereupon the inverted signal of the MAX DUTY signal 15 is inputted to an OR circuit 18. The CLOCK terminal of the oscillator 14 and the high voltage terminal of the N-type MOSFET 6 are connected to an AND circuit 19, and the output signal of the AND circuit 19 is inputted to the set terminal S of an RS flip-flop circuit 21. The output signal of an AND circuit 20 is inputted to the other input of the OR circuit 18. The output signal of an overcurrent detection circuit 12 and a signal passed via a blanking pulse oscillator 22 when the GATE signal of the switching element 1 is ON are inputted to the inputs of the AND circuit 20 respectively. The output signal of the OR circuit 18 is inputted to the reset terminal R of the RS flip-flop circuit 21. Three signals, which are the output signal of the startup/stoppage circuit 4, the signal of the output terminal Q of the RS flip-flop circuit 21, and the MAX DUTY signal 15 of the oscillator 14, are inputted to the AND circuit 17. The output signal of the AND circuit 17 is connected to the GATE terminal of the switching element 1.

The operation of the semiconductor device thus constituted will now be described using the operation waveform of FIG. 6. VFB in FIG. 6 indicates the FB terminal voltage of the control circuit 2 in FIG. 5, and IDRAIN indicates the drain current flowing between the DRAIN terminal and SOURCE terminal of the switching element 1.

The BP terminal, which is the reference voltage terminal of the control circuit 2, is supplied with a current from the DRAIN terminal via the regulator 3 so that a fixed voltage is always provided during operation. When the BP terminal voltage is equal to or more than the startup voltage prescribed by the startup/stoppage circuit 4, the output signal of the startup/stoppage circuit 4 is "H (high)" and the switching element 1 is controlled by the MAX DUTY signal 15 of the oscillator 14 and the signal of the output terminal Q of the RS flip-flop circuit 21. Conversely, when the BP terminal voltage is equal to or less than the stoppage voltage prescribed by the startup/stoppage circuit 4, because the output voltage of the startup/stoppage circuit 4 is always "L (low)", control of the switching element 1 is for the stoppage state.

In the operating state of the control circuit 2, when the FB terminal voltage of the control circuit 2 that controls the switching element 1 is the "H (high)" signal, the output of the AND circuit 19 is then the CLOCK signal 16 of the oscillator 14, and hence the switching element 1 is controlled by the output signal of the AND circuit 17 to which the MAX DUTY signal 15 and CLOCK signal 16 are inputted (region A in FIG. 6). Here, the peak of the drain current IDRAIN flowing between the DRAIN terminal and the SOURCE terminal of the switching element 1 (the overcurrent detection level) is always made constant by the overcurrent detection circuit 12. Further, when the FB terminal voltage of the control circuit 2 that controls the switching element 1 is the "L (low)" signal, the output of the AND circuit 19 is always "L (low)", and the switching element 1 is always in the OFF state (region B in FIG. 6). That is, when a conventional semiconductor device is used in the switching power supply, the supply of electric power to the output side is implemented (intermittent control) by adjusting the switching count of the linear switching element 1 by inputting a feedback signal that reflects the output load state to the FB terminal. For this reason, higher efficiency, that is, power conservation, can be achieved for the switching power supply.

However, when a higher output for the switching power supply is implemented by using a conventional semiconductor device, the following problems arise:

(1) In order to intermittently control the switching element 1 linearly according to the output voltage, the intermittent operating frequency is inputted in the audible range during the switching operation, and hence noise from the transformer, coil, and so forth, which are used for the switching power supply, is generated. Particularly in terms of the output characteristics of the switching power supply, the noise also increases because, when a higher output is required, it is necessary to increase the peak current value (overcurrent detection level) of the IDRAIN determined by the overcurrent detection circuit. When a higher output for the switching power supply is attempted with a conventional semiconductor device, noise from the transformer, coil, and the like, is generated, which represents an obstacle to usage in a high output switching power supply.

(2) When the output of the switching power supply is increased by using a conventional semiconductor device, because the overcurrent detection level must be increased as also mentioned in (1) above, when the output load state is a light load state or loadless state, the increased voltage and the switching loss during turnoff increases. Hence, this is an obstacle to higher efficiency.

The present invention was conceived in view of the above problems and provides a high-output and high-efficiency switching power supply.

SUMMARY OF THE INVENTION

In order to resolve the above problems, the semiconductor device of the present invention is a semiconductor device that comprises a switching element including a high potential terminal, a low potential terminal and a control terminal; and a control circuit that includes a reference voltage terminal connected via a regulator to the high potential terminal, and a feedback signal input terminal. This control circuit is connected to the high potential terminal, low potential terminal and control terminal of the switching element, and controls the switching operation that is an ON/OFF iteration of the switching element.

The control circuit comprises a first current mirror circuit constituted by a first p-type switch element, the high potential terminal of which is connected to the reference voltage terminal, the control terminal of which is connected to the feedback signal input terminal and the control terminal of a second p-type switch element, and the low potential terminal of which is connected to the feedback signal input terminal and the control terminal thereof; and a second p-type switch element, the high potential terminal of which is connected to the reference voltage terminal, the control terminal of which is connected to the feedback signal input terminal and the control terminal of the first p-type switch element, and the low potential terminal of which is connected to the high potential terminal of a first n-type switch element; a second current mirror circuit constituted by a first n-type switch element, the high potential terminal of which is connected to the low potential terminal of the second p-type switch element, the control terminal of which is connected to the low potential terminal of the second p-type switch element and to the control terminal of a second n-type switch element, and the low potential terminal of which is grounded; and a second n-type switch element, the high potential terminal of which is connected to the reference voltage terminal via a resistor, the control terminal of which is connected to the high potential terminal and control terminal of the first n-type switch element, and the low potential terminal of which is grounded; an overcurrent detection level tuning circuit comprising the second current mirror circuit and a clamp circuit and constituted such that the high potential terminal of the second n-type switch element of the second current mirror circuit is further connected to the clamp circuit, the input terminal of an intermittent oscillation control circuit, and the detection terminal of a first comparator of an overcurrent detection circuit; an overcurrent detection circuit, the detection terminal of the first comparator of which is connected to the high potential terminal of the switching element; and an intermittent oscillation control circuit that comprises a second comparator that has a reference terminal for switching the reference voltage to an intermittent oscillation detection upper-limit voltage and an intermittent oscillation detection lower-limit voltage by means of a detection terminal to which the high potential terminal of the second n-type switch element is connected and by means of the signal of the detection terminal, wherein the intermittent oscillation control circuit stops the switching operation of the switching element when the signal of the detection terminal is smaller than the intermittent oscillation detection lower-limit voltage and resumes the switching operation of the switching element when the signal of the detection terminal is larger than the intermittent oscillation detection upper-limit voltage.

Further, in order to resolve the above problem, the semiconductor device of the present invention is a semiconductor device that comprises a first switching element including a high potential terminal, a low potential terminal and a control terminal; a second switching element connected in parallel with the first switching element, and including a high potential terminal connected to the high potential terminal of the first switching element, a low potential terminal connected to the low potential terminal of the first switching element, and the control terminal connected to the control terminal of the first switching element; and a control circuit including a reference voltage terminal connected via a regulator to the high potential terminals of the first and second switching elements respectively, and a feedback signal input terminal. This control circuit is connected to the high potential terminal, low potential terminal and control terminal of the switching element, thereby to control the switching operation that is an ON/OFF iteration of the switching element. In exactly the same fashion as the control circuit above, the control circuit includes a first current mirror circuit, a second current mirror circuit, an overcurrent detection level tuning circuit, an overcurrent detection circuit, and an intermittent oscillation control circuit.

The above semiconductor device preferably comprises an overheating protection function.

Further, the switching element and control circuit are preferably integrated on the same semiconductor substrate and integrated into a package comprising four or more terminals.

When the present invention is employed as a high output switching power supply, a high efficiency switching power supply in which noise from the coil, transformer, and the like, can be markedly suppressed and the power consumption is markedly reduced in comparison with the prior art can be implemented.

Furthermore, it is possible to implement a smaller, lower cost power supply by integrating the control circuit and switching element on the same semiconductor substrate.

When the semiconductor device of the present invention is employed as a high output switching power supply, it is possible to implement a highly efficient switching power supply whereby the noise from the coil, transformer and so forth can be markedly suppressed in comparison with the prior art and power consumption is markedly reduced, and a more miniature and low-cost power supply can be implemented by integrating the control circuit and switching element on the same semiconductor substrate. This semiconductor device can be applied to a semiconductor device used in a power supply device such as a switching power supply.

DESCRIPTION OF THE PREFERRED EMBODIMENTS

Embodiments of the present invention will be described below.

First Embodiment

Figure 1:
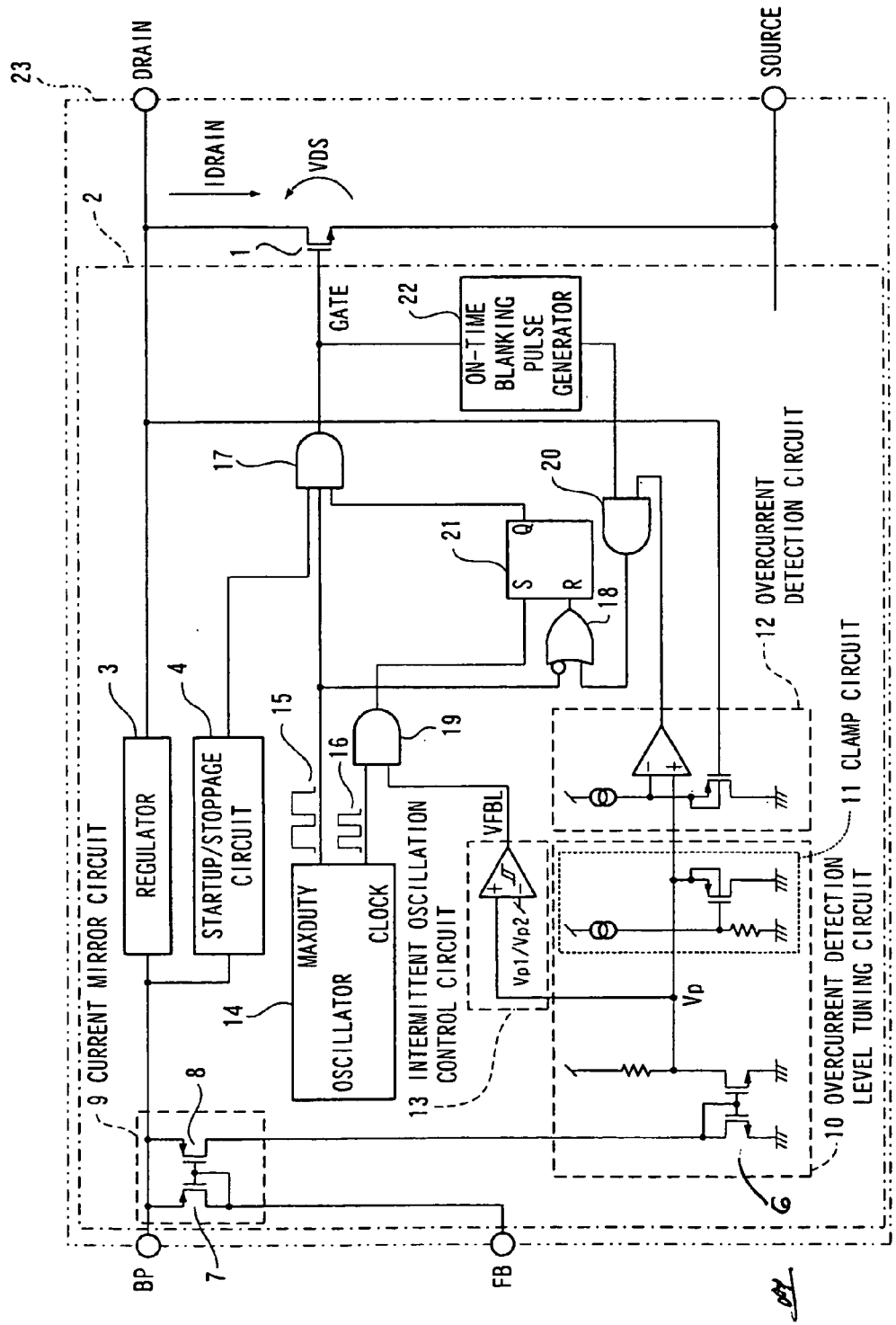
FIG. 1 is a constitutional view of a semiconductor device of a first embodiment of the present invention.

FIG. 1 is a constitutional view of the semiconductor device of the first embodiment of the present invention.

Figure 5:
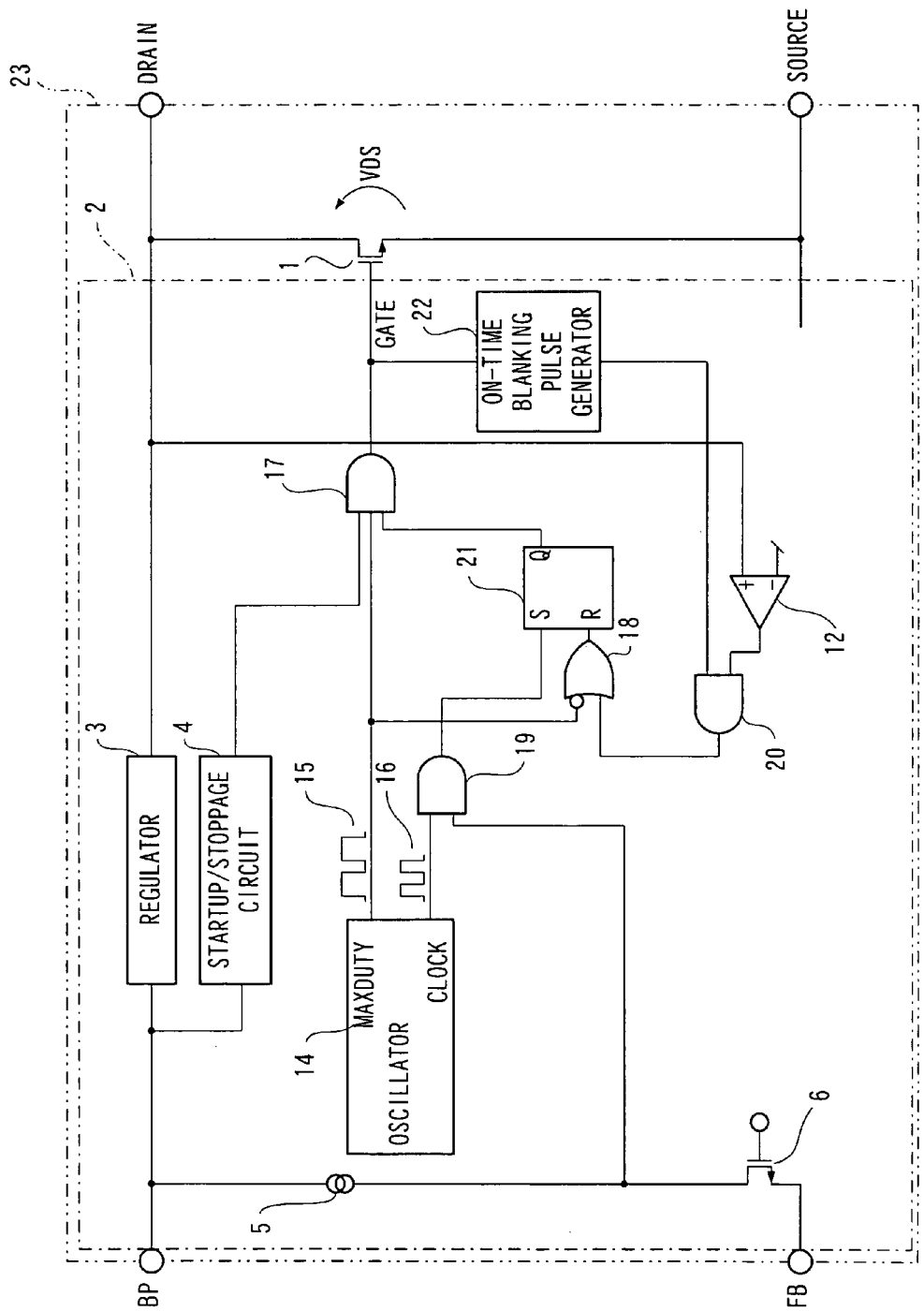
FIG. 5 is a constitutional view of a semiconductor device according to a conventional technology.
Figure 6:
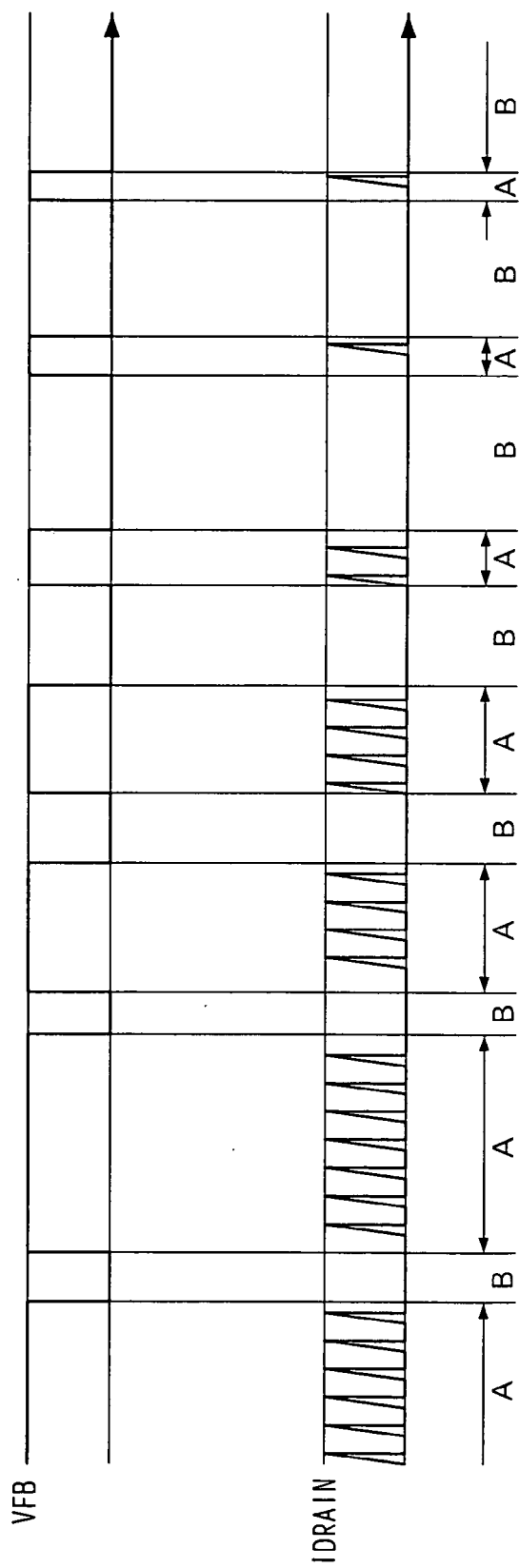
FIG. 6 shows an operation of the semiconductor device according to conventional technology.

In comparison with the conventional example shown in FIG. 5, the semiconductor device of FIG. 1 differs in that a current mirror circuit 9, an overcurrent detection level tuning circuit 10, a clamp circuit 11, an overcurrent detection circuit 12, and an intermittent oscillation control circuit 13 have been added.

The operation of the semiconductor device thus constituted will now be described using the operation waveform shown in FIG. 2. IFB in FIG. 2 denotes the FB terminal current of the control circuit 2 in FIG. 1; VFBL denotes the output signal of the intermittent oscillation control circuit 13 in FIG. 1; Vp denotes the terminal voltage connected to the+terminal of the intermittent oscillation control circuit 13; and the IDRAIN denotes the drain current flowing between the DRAIN terminal and SOURCE terminal of the switching element 1.

The BP terminal, which is the reference voltage terminal of the control circuit 2, is supplied with current from the DRAIN terminal via the regulator 3 so that a fixed voltage is always provided during operation. When the BP terminal voltage is equal to or more than the startup voltage prescribed by the startup/stoppage circuit 4, the output signal of the startup/stoppage circuit 4 is "H (high)", and the switching element 1 is controlled by the MAX DUTY signal 15 of the oscillator 14 and the signal of the output terminal Q of the RS flip-flop circuit 21. Conversely, when the BP terminal voltage is equal to or less than the stoppage voltage prescribed by the startup/stoppage circuit 4, because the output voltage of the startup/stoppage circuit 4 is always "L (low)", control of the switching element 1 is for the stoppage state.

In the operating state of the control circuit 2, when the current IFB flows from the BP terminal to the FB terminal via a p-type MOSFET 7 and increases, the current flowing between the drain and source of the p-type MOSFET 8 also increases as a result of the current mirror circuit 9. Because a current mirror circuit constituted by the two n-type MOSFETs of the overcurrent detection level tuning circuit is connected to a p-type MOSFET 8, the Vp voltage varies such that the Vp terminal voltage drops in accordance with an increase in the IFB current and the Vp terminal voltage increases in accordance with a decrease in the IFB current as shown in FIG. 2, in accordance with the increase in IFB current. The fluctuation in the Vp terminal voltage is the reference terminal voltage of the overcurrent detection circuit 12, and therefore the peak value of the IDRAIN current flowing from the DRAIN terminal to the SOURCE terminal of the switching element 1 is subject to PWM control that performs variation in the same manner as the variation of the Vp terminal voltage variation. Here, the Vp terminal voltage is established so that the Vp terminal voltage is not equal to or more than the voltage prescribed by the clamping circuit 11.

Next, when the Vp terminal voltage drops to or below the reference voltage Vp1 of the intermittent oscillation control circuit 13 in accordance with an increase in the IFB current, the VFBL signal goes from "H (high)" to "L (low)", and the reference voltage of the intermittent oscillation control circuit 13 is also switched from Vp1 to Vp2 at the same time. When the VFBL is "L (low)", the ON/OFF control of the switching element 1 stops during this period and the IDRAIN is therefore subject to intermittent oscillation control. Further, when the IFB current decreases, the Vp terminal voltage increases, and when same is at or more than the reference voltage Vp2 of the intermittent oscillation control circuit 13, the output signal of the intermittent oscillation control circuit 13 is switched from "L (low)" to "H (high)" and ON/OFF control of the switching element 1 is started by the control circuit 2.

Figure 2:
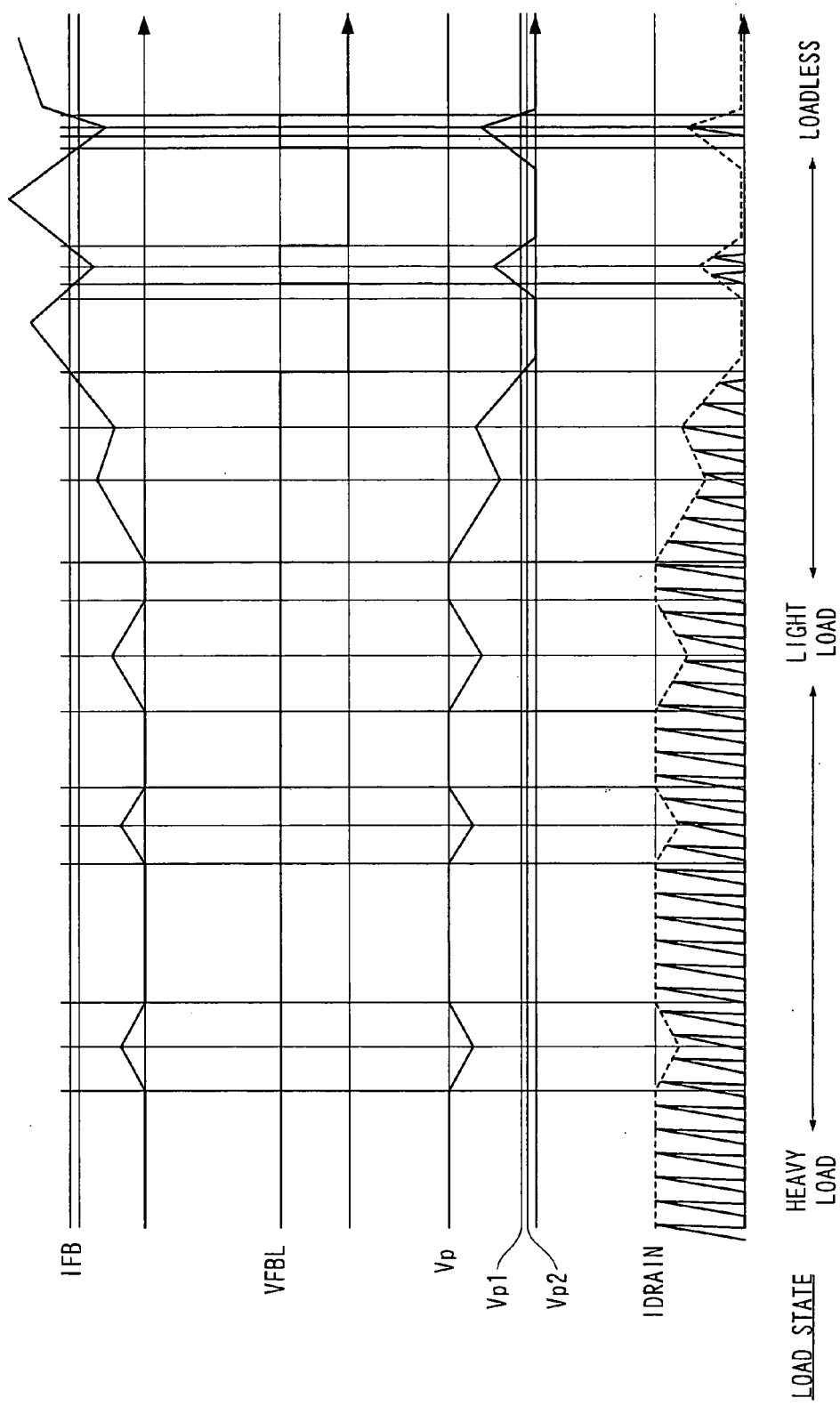
FIG. 2 shows an operation of the semiconductor device of the first embodiment of the invention.

When an increase in the output of the switching power supply is implemented by employing the semiconductor device of this embodiment, the voltage Vp in FIG. 2 changes while the output load state changes from a heavy load state to a light load state by allowing the signal indicating the output load state to be reflected as current flowing out from the FB terminal, the oscillation frequency of the switching element 1 is constant, and PWM control, which varies the current peak value of the IDRAIN, is implemented. The audible region is therefore not reached. As a result, the noise of the coil, transformer, and so forth, can be prevented, and the switching loss when the switching power supply is turned OFF when the output load state is the light load state can be decreased. Further, when the output load changes further from the light load state to the loadless state, the voltage Vp is at or below Vp1 and the switching element 1 is subject to intermittent oscillation control. Hence, the power supply can be rendered more efficient so that the switching loss is further decreased. Thereupon, because the peak value of the IDRAIN itself can be decreased, the noise from the coil, transformer, and the like during intermittent oscillation control can be kept low.

Second Embodiment

Figure 3:
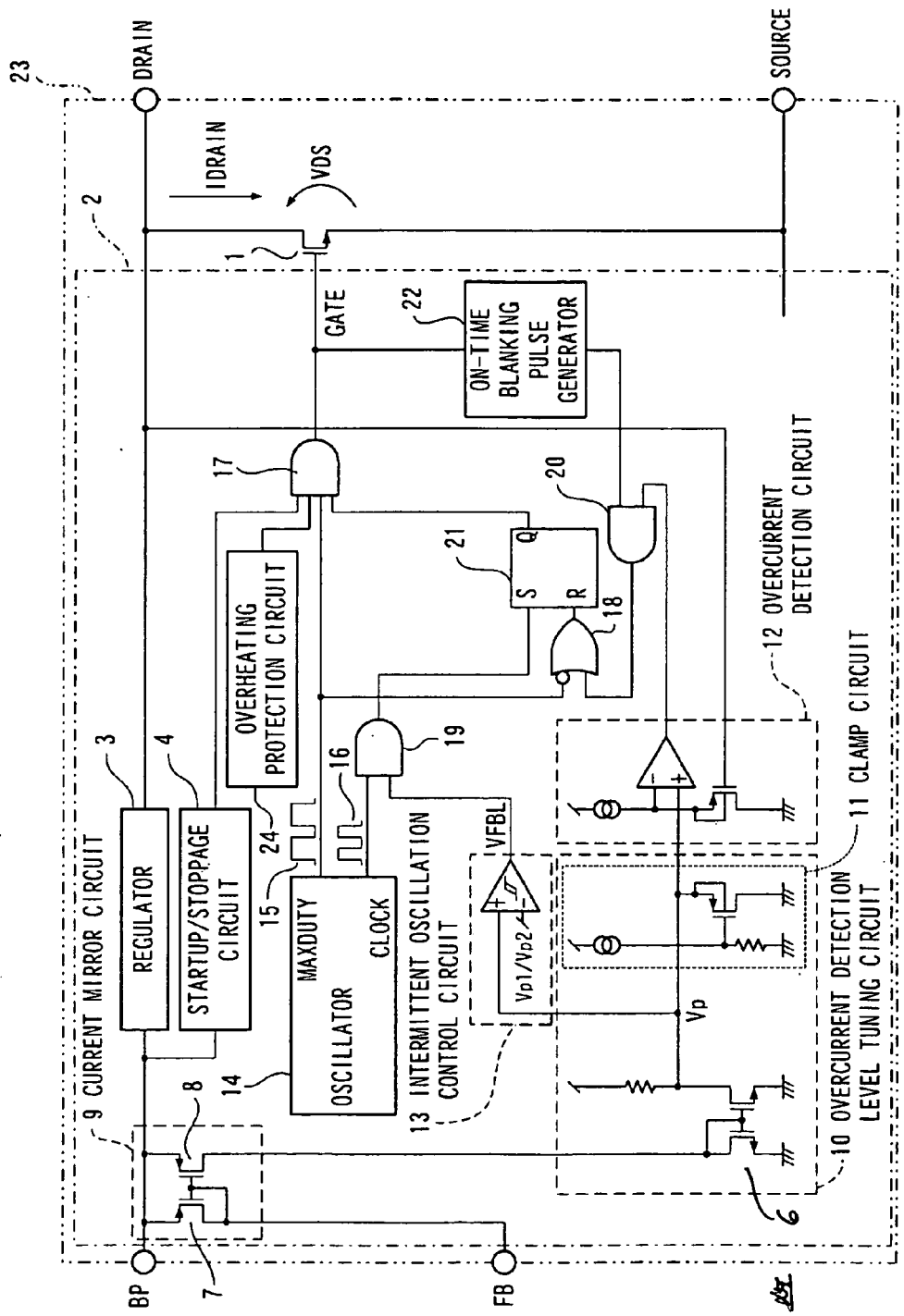
FIG. 3 is a constitutional view of a semiconductor device of a second embodiment of the invention.

FIG. 3 is a constitutional view of the semiconductor device of the second embodiment of the invention. The circuit constitution and operation are also completely the same except for the fact that the overheating protection circuit 24 is added to the semiconductor device of the first embodiment shown in FIG. 1.

The overheating protection circuit 24 is a circuit for protecting a semiconductor device 23, which comprises the switching element 1 and control circuit 2, from heat emitted by the semiconductor device 23 by means of the ON/OFF control of the switching element 1. Examples of protection afforded by the overheating protection circuit 24 include a latch mode (a mode in which the ON/OFF control of the switching element 1 is completely stopped until this ON/OFF control is cancelled by cancellation means when the temperature exceeds that prescribed), and a self-feedback mode (a mode in which the ON/OFF control of the switching element 1 is stopped when the temperature exceeds that prescribed and the ON/OFF control of the switching element 1 is restarted automatically when the temperature drops to or below the prescribed temperature). The semiconductor device 23 is accordingly protected.

Third Embodiment

Figure 4:
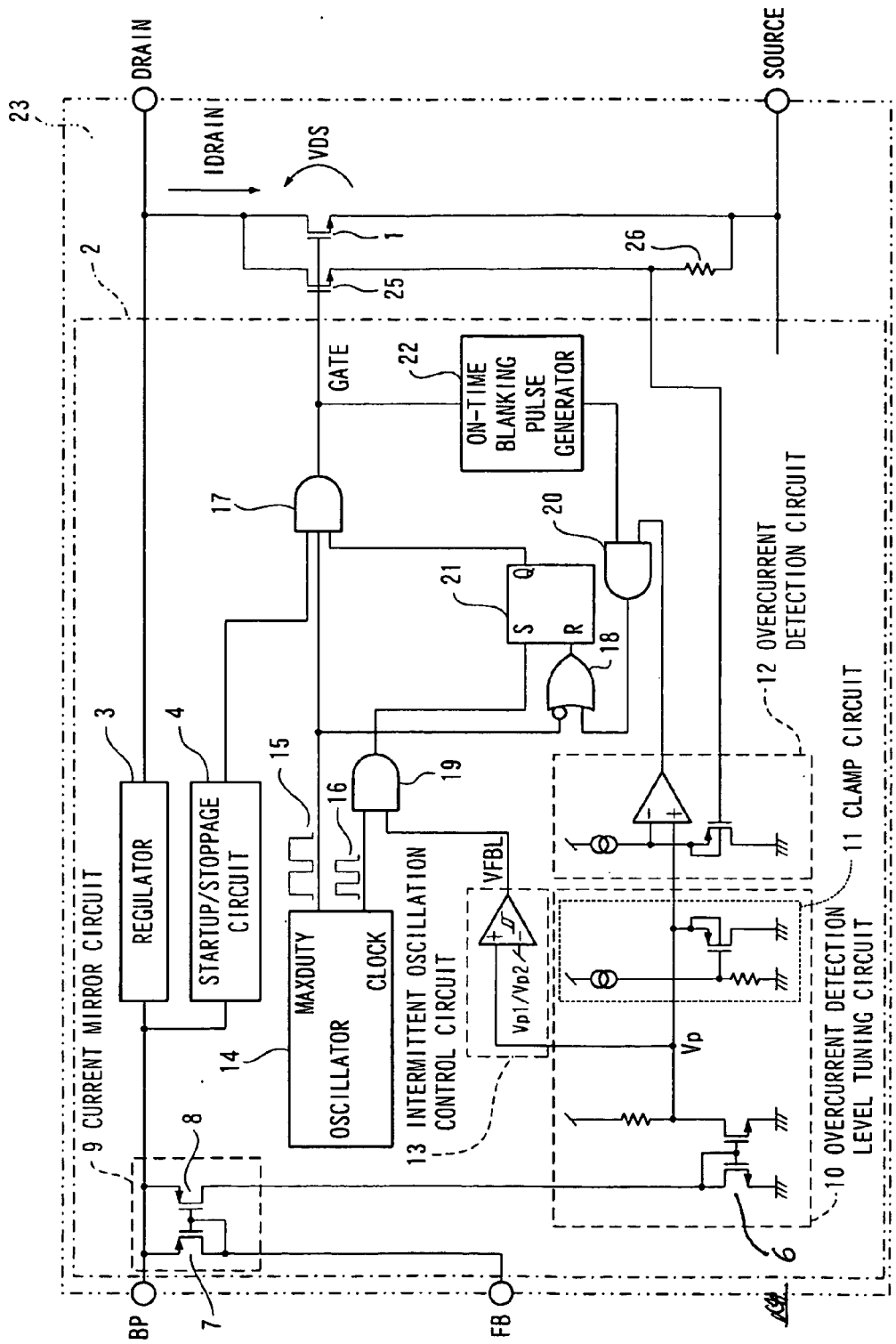
FIG. 4 is a constitutional view of a semiconductor device of a third embodiment of the invention.

FIG. 4 is a constitutional view of the semiconductor device of the third embodiment of this invention. The semiconductor device of the third embodiment of the present invention shown in FIG. 4 pertains to the overcurrent detection method, and, with regard to the method of detecting the ON voltage of the switching element 1, the semiconductor device of the first embodiment in FIG. 1 has a certain fixed current ratio with the switching element 1, the operation being the same as the first embodiment of the present invention except for being different by virtue of being a method in which a sense MOSFET 25 connected in parallel to the switch element 1 and a sense resistor 26 connected in series to the source terminal of the sense MOSFET 25 are used and the voltage across the terminals of the sense resistor 26 is detected.

Further, by adding the overheating protection circuit 24 as shown in the second embodiment of the present invention above to the third embodiment of the present invention, the function to protect the semiconductor device 23 from the heat emitted by the semiconductor device 23 can also be added.

As mentioned earlier, in a case where the semiconductor device of the respective first to third embodiments of the present invention is used as a switching power supply, a higher efficiency switching power supply can be implemented, that is, power conservation can be achieved, by operating the semiconductor device depending on the state of the output load, i.e. under PWM control as the state changes from (i) a heavy load state to a light load state and under intermittent oscillation control as the state changes from (ii) a light load state to a loadless state.

Further, even when the semiconductor device of the respective first to third embodiments of the present invention is used in a high output switching power supply, the audible region is not reached because the frequency is fixed when the ON/OFF control of the switching element 1 is in the PWM control state, and the IDRAIN peak value is kept low when the ON/OFF control of the switching element 1 is in the intermittent oscillation control state. The noise from the coil, transformer, and so forth, can therefore be kept low.

What is claimed is:

1. A semiconductor device, comprising a switching element (1), comprising a high potential terminal, a low potential terminal and a control terminal; and a control circuit (2) comprising a reference voltage terminal (BP) connected via a regulator (3) to the high potential terminal, and a feedback signal input terminal (FB), the control circuit being connected to the high potential terminal, low potential terminal and control terminal of the switching element, thereby to control a switching operation that is an ON/OFF iteration of the switching element (1), the control circuit (2), comprising:

a first current mirror circuit (9) comprising a first p-type switch element (7) and a second p-type switch element (8), the high potential terminal of the first p-type switch element (7) is connected to the reference voltage terminal (BP), the control terminal of the first p-type switch element (7) is connected to the feedback signal input terminal (FB) and the control terminal of the second p-type switch element (8), the low potential terminal of the first p-type switch element (7) is connected to the feedback signal input terminal (FB) and the control terminal of the first p-type switch element (7), the high potential terminal of the second p-type switch element (8) is connected to the reference voltage terminal (BP), the control terminal of the second p-type switch element (8) is connected to the feedback signal input terminal (FB) and the control terminal of the first p-type switch element (7), and the low potential terminal of the second p-type switch element (8) is connected to the high potential terminal of a first n-type switch element (6);

a second current mirror circuit comprising the first n-type switch element (6) and a second n-type switch element, the high potential terminal of the first n-type switch element (6) is connected to the low potential terminal of the second p-type switch element (8), the control terminal of the first n-type switch element (6) is connected to the low potential terminal of the second p-type switch element (8) and to the control terminal of a second n-type switch element, the low potential terminal of the first n-type switch element (6) is grounded, the high potential terminal of the second n-type switch element is connected to the reference voltage terminal via a resistor, the control terminal of the second n-type switch element is connected to the high potential terminal and control terminal of the first n-type switch element (6), and the low potential terminal of the second n-type switch element is grounded;

an overcurrent detection level tuning circuit (10) comprising the second current mirror circuit and a clamp circuit (11), the high potential terminal of the second n-type switch element of the second current mirror circuit is further connected to the clamp circuit (11), the input terminal of an intermittent oscillation control circuit (13), and the detection terminal of a first comparator of an overcurrent detection circuit (12);

an overcurrent detection circuit (12), the detection terminal of the first comparator of which is connected to the high potential terminal of the switching element; and the intermittent oscillation control circuit (13) comprising a second comparator that has a reference terminal for switching the reference voltage to an intermittent oscillation detection upper-limit voltage and an intermittent oscillation detection lower-limit voltage by means of a detection terminal to which the high potential terminal of the second n-type switch element is connected and by means of the signal of the detection terminal, wherein the intermittent oscillation control circuit (13) stops the switching operation of the switching element when the signal of the detection terminal is smaller than the intermittent oscillation detection lower-limit voltage and resumes the switching operation of the switching element when the signal of the detection terminal is larger than the intermittent oscillation detection upper-limit voltage.

2. A semiconductor device, comprising a first switching element (1), comprising a high potential terminal, a low potential terminal and a control terminal; a second switching element (25) connected in parallel with the first switching element, and comprising a high potential terminal connected to the high potential terminal of the first switching element, a low potential terminal connected to the low potential terminal of the first switching element, and a control terminal connected to the control terminal of the first switching element; and a control circuit (2) comprising a reference voltage terminal (BP) connected via a regulator (3) to the high potential terminals of the first and second switching elements respectively, and a feedback signal input terminal (FB), the control circuit being connected to the high potential terminal, low potential terminal and control terminal of the switching element, thereby to control a switching operation that is an ON/OFF iteration of the switching element, the control circuit, comprising:

a first current mirror circuit (9) comprising a first p-type switch element (7) and a second p-type switch element (8), the high potential terminal of the first p-type switch element (7) is connected to the reference voltage terminal (BP), the control terminal of the first p-type switch element (7) is connected to the feedback signal input terminal (FB) and the control terminal of a second p-type switch element (8), the low potential terminal of the first p-type switch element (7) is connected to the feedback signal input terminal (FB) and the control terminal of the first p-type switch element (7), the high potential terminal of the second p-type switch element (8) is connected to the reference voltage terminal (BP), the control terminal of the second p-type switch element (8) is connected to the feedback signal input terminal (FB) and the control terminal of the first p-type switch element (7), and the low potential terminal of the second p-type switch element (8) is connected to the high potential terminal of a first n-type switch element (6);

a second current mirror circuit comprising the first n-type switch element (6) and a second n type switch element, the high potential terminal of the first n-type switch element (6) is connected to the low potential terminal of the second p-type switch element (8), the control terminal of the first n-type switch element (6) is connected to the low potential terminal of the second p-type switch element (8) and to the control terminal of a second n-type switch element, and the low potential terminal of the first n-type switch element (6) is grounded, the high potential terminal of the second n type switch element is connected to the reference voltage terminal via a resistor, the control terminal of the second n type switch element is connected to the high potential terminal (BP) and control terminal of the first n-type switch element (6), and the low potential terminal of the second n type switch element is grounded;

an overcurrent detection level tuning circuit (10) comprising the second current mirror circuit and a clamp circuit (11) and constituted such that the high potential terminal of the second n-type switch element of the second current mirror circuit is further connected to the clamp circuit (11), the input terminal of the intermittent oscillation control circuit (13), and the detection terminal of a first comparator of an overcurrent detection circuit;

an overcurrent detection circuit (12), the detection terminal of the first comparator of which is connected to the high potential terminal of the switching element; and the intermittent oscillation control circuit (13) comprising a second comparator that has a reference terminal for switching the reference voltage to an intermittent oscillation detection upper-limit voltage and an intermittent oscillation detection lower-limit voltage by means of a detection terminal to which the high potential terminal of the second n-type switch element is connected and by means of the signal of the detection terminal, wherein the intermittent oscillation control circuit (13) stops the switching operation of the switching element when the signal of the detection terminal is smaller than the intermittent oscillation detection lower-limit voltage and resumes the switching operation of the switching element when the signal of the detection terminal is larger than the intermittent oscillation detection upper-limit voltage.

3. The semiconductor device according to claim 1, comprising an overheating protection function.

4. The semiconductor device according to claim 1, wherein the switching element and control circuit are integrated on a same semiconductor substrate and integrated in a package comprising four or more terminals.

* * * * *